Sept. 4, 1951  C. HOLLERITH  2,566,663
FORGED WHEEL
Filed Dec. 11, 1947
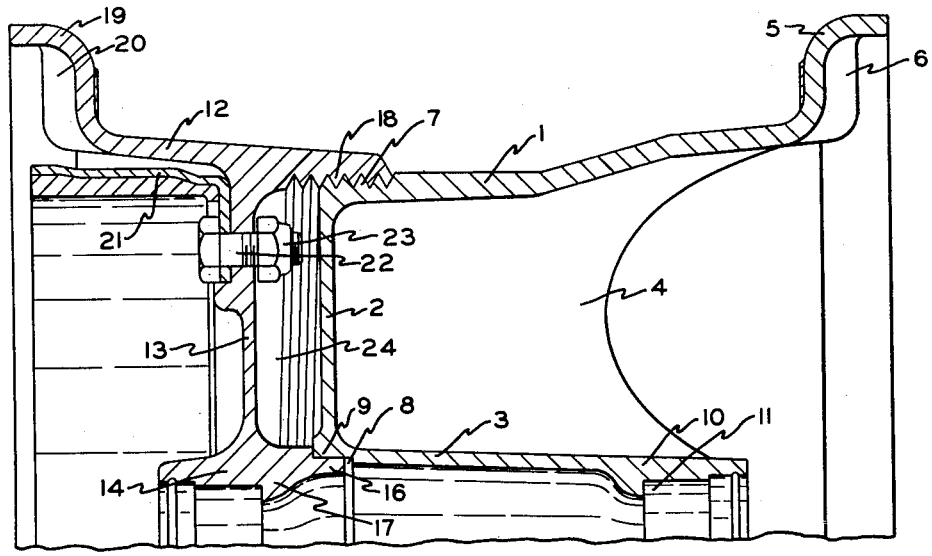
FIG I
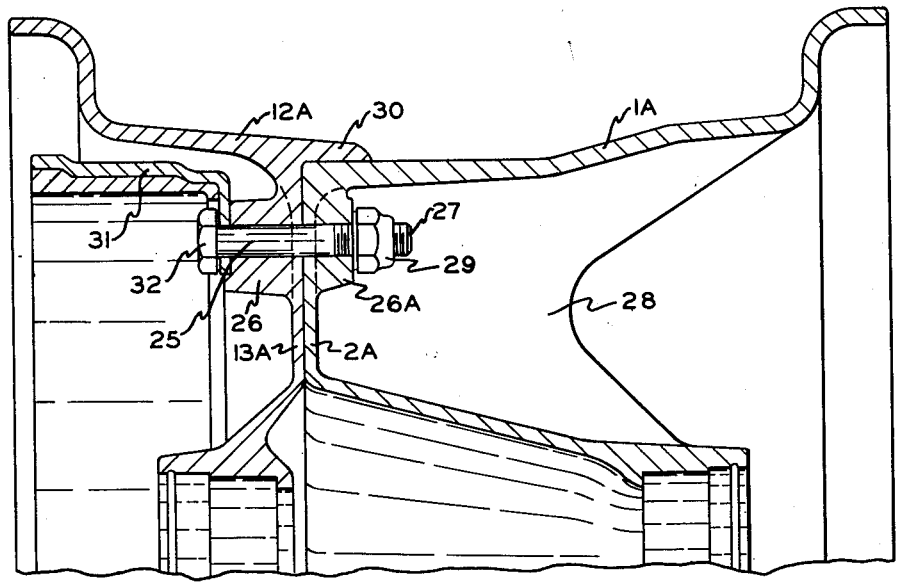
FIG II
Inventor
CHARLES HOLLERITH
By Beaman & Patch Patented Sept. 4, 1951

2,566,663

UNITED STATES PATENT OFFICE 2,566,663

FORGED WHEEL

Charles Hollerith, Jackson, Mich., assignor, by mesne assignments, to The B. F. Goodrich Company, Akron, Ohio, a corporation of New York Application December 11, 1947, Serial No. 790,946

1 Claim. (Cl. 301—6)

This invention relates to wheel structures and in particular to wheel structures intended for use on aircraft.

An object of the invention is to provide an improved wheel construction which is particularly suitable to form an aircraft wheel and which involves the use of the minimum number of component parts, the assembly of which can be accomplished in a simple yet efficient manner.

The invention also has for its object to provide a forged or die cast wheel composed of adjacent sections which form the wheel rim and hub as well as the radial connecting webs therefor and which sections are adequately supported against the bursting forces or loads imposed thereon by the tire.

The invention also has for its object to provide a wheel structure composed of a pair of adjacent wheel sections connected together so that the one section can be readily displaced laterally and removed if and when required, the other section serving to carry the wheel brake drum.

These and other objects and advantages residing in the construction, arrangement and combination of the several parts constituting the wheel construction will be more apparent from a consideration of the following description and claim.

In the drawings:

Fig. I is a fragmentary vertical cross-sectional view through a wheel structure in accordance with the invention, and Fig. II is a similar view to Fig. I but of a modified wheel construction in accordance with the invention.

In the drawings, wherein like parts have been given the same reference numerals, and referring first to Fig. I a wheel structure is composed of two adjacent forged or die cast sections of which the one section is formed to provide an outer rim forming circumferential flange I joined by a radial web 2 with an inner hub forming circumferential flange 3, the two said flanges being also joined and reinforced by a series of circumferentially spaced radial ribs 4 extending axially with respect to the resulting wheel section.

The outer edge of the rim forming flange I is formed with an outwardly directed tire retaining flange 5 formed at circumferentially spaced intervals with a series of lugs 6 and at its opposite end this flange I is formed with an externally screw-threaded portion 7. The hub forming flange 3 on the other hand is formed on its interior surface, at the inner end thereof, with a rabbet 8 providing a radially stepped cylindrical surface 9, while at its outer end this flange is thickened, as indicated at 10, and is rabbeted adjacent thereto, as indicated at 11, to provide for the mounting of the wheel hub bearings.

The other wheel forming section is formed to provide an outer circumferential flange 12 which extends from opposite sides of a radial web 13 which joins the flange 12 with the inner circumferential and hub forming flange 14 of this wheel section. At its inner end and on its exterior surface this flange 14 is formed with a rabbet which provides a circumferential cylindrical surface 16. On its interior surface this flange 14 is thickened, as indicated at 17, and is rabbeted adjacent thereto to provide for the accommodation of the hub bearings at this end of the hub.

The rim forming flange 12 is formed on its interior surface with a screw-threaded portion 18 with which the correspondingly screw-threaded portion 7 of the other wheel section is engageable to secure the two wheel sections together at the same time as the cylindrical surfaces 9 and 16 of the opposed hub forming flanges are telescoped with respect to one another.

The rim forming flange 12 on its outer edge is formed with the other tire retaining flange 19 which is also preferably formed with circumferentially spaced strengthening lugs 20.

The web 13 serves to support a brake drum 21 secured in position by bolts 22 and nuts 23, which latter are normally accommodated within the enclosed annular space 24 formed between the laterally spaced webs 13 and 2 of the wheel sections.

With a wheel constructed as shown in Fig. I the advantage is obtained that the forces imposed upon the tire retaining flanges 5 and 19 by the tire are adequately absorbed by the continuous screw-threaded connection afforded at 7 and 18 by the thus connected wheel sections. This construction also assures maintenance of cylindrical shape and concentricity of the rim and hub and of the piloted interfitting surfaces due to the close positioning of the webs of the wheel sections to these interfitting portions and provides a structure in which one wheel section is relatively short in the axial direction as compared to the other wheel section. Also the wheel construction is simple and permits of easy manufacture. Further it is readily possible for the one wheel section, comprising the rim flange 1 and the hub flange 3, together with its interconnecting web 2, to be completely detached from the other wheel section without disturbing the wheel brake.

Referring now to the other wheel construction as shown in Fig. II the opposed radial web 2a and 13a of the separately formed and laterally adjacent wheel body sections 1a and 12a are brought into contacting relationship and are so held together by a series of circumferentially spaced and axially extending bolts 25 passed through axially aligned bores in the opposed said webs. These bores extend also through thickened boss portions 26, 26a of the webs 13a and 2a respectively and the bolts have screw-threaded extremities 27 which project into the cavities defined by the ribs 28 in the wheel sections 1a and serve to receive the securing nuts 29.

Each wheel section is formed to provide a complementary rim portion around its outer periphery and a complementary hub portion around its inner periphery, as is clearly shown in the drawing, while the one wheel section 12a is also formed with an annular flange portion 30 the interior diameter of which corresponds with the exterior diameter of the web 2a and which flange serves as a guide to locate or pilot the two wheel sections in their proper radial positions relatively to each other, whereafter it only becomes necessary to align the said bores for the introduction of the securing bolts 25.

A brake drum 31 is carried upon the outside of the web 13a and is conveniently secured to the latter by its engagement by the bolt heads 32.

Having thus described my invention, what I claim as novel is:

A sectional wheel structure comprising a pair of complementary wheel sections each having an outer annular flange defining the rim and an inner annular flange defining the hub, one of said wheel sections being relatively short in axial direction as compared to the other wheel section, radial webs connecting said flanges of each section and disposed in relatively close proximity to one another and to one side of the center plane of the wheel by virtue of the unsymmetrical disposition thereof in the axial direction of the wheel, radial ribs extending between the inner and outer annular flanges of one of said wheel sections, axially extending telescoping portions on said wheel sections for piloting one section on the other, said portions being disposed to the same side of said plane as said radial webs, means for holding said sections assembled, an annulus defined between the outer and inner flanges of said relatively short section and a brake drum attached to the radial web of said relatively short section and disposed in said annulus.

CHARLES HOLLERITH.

REFERENCES CITED

The following references are of record in the file of this patent:

UNITED STATES PATENTS

| Number | Name | Date |
|---|---|---|
| 2,105,317 | Frank | Jan. 11, 1938 |
| 2,407,423 | Hollerith | Sept. 10, 1946 |